United States Patent
Bank et al.

(10) Patent No.: US 10,896,228 B2
(45) Date of Patent: *Jan. 19, 2021

(54) ESTIMATING ARTICLE PUBLICATION DATES AND AUTHORS BASED ON SOCIAL MEDIA CONTEXT

(71) Applicant: International Business Machines Corporation, Armonk, NY (US)

(72) Inventors: Judith H. Bank, Cary, NC (US); Lisa M. W. Bradley, Cary, NC (US); Aaron J. Quirk, Raleigh, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/992,434

(22) Filed: May 30, 2018

(65) Prior Publication Data

US 2018/0276212 A1 Sep. 27, 2018

Related U.S. Application Data

(63) Continuation of application No. 15/052,084, filed on Feb. 24, 2016, now Pat. No. 10,061,774, which is a
(Continued)

(51) Int. Cl.
*G06F 16/93* (2019.01)
*G06N 7/00* (2006.01)
(Continued)

(52) U.S. Cl.
CPC .......... *G06F 16/93* (2019.01); *G06F 16/951* (2019.01); *G06N 7/005* (2013.01); *G06F 40/197* (2020.01)

(58) Field of Classification Search
CPC .... G06F 16/93; G06F 16/9535; G06F 16/248; G06F 16/38; G06F 16/335; G06F 16/986;
(Continued)

(56) References Cited

U.S. PATENT DOCUMENTS 6,026,388 A 2/2000 Liddy et al.
8,326,829 B2 12/2012 Gupta
(Continued)

OTHER PUBLICATIONS

List of IBM Patents or Patent Applications Treated as Related, dated May 30, 2018, 2 pages.
(Continued)

*Primary Examiner* — Boris Gorney
*Assistant Examiner* — Bao G Tran
(74) *Attorney, Agent, or Firm* — Scully, Scott, Murphy & Presser, P.C.; Steven Bouknight

(57) ABSTRACT

Probable origination date may be derived by using a stream of data captured, for example, from the Internet and from other documentation sources such as historical information about a target object, its author, related environmental data, social media data, blogs, microblogs, posts, historical information, and/or other data sources. Techniques such as textual analysis, statistical analytics, and/or artificial intelligence may combine and correlate the information from data sources to extract clues that may indicate the original author and date of authorship. Based on the number of conflicting or validating references, and the relationships between them, a probability or confidence score in the accuracy of the analysis may be generated.

7 Claims, 4 Drawing Sheets

Related U.S. Application Data continuation of application No. 14/591,554, filed on Jan. 7, 2015, now Pat. No. 10,073,845.

(51) Int. Cl.
*G06F 16/951* (2019.01)
*G06F 40/197* (2020.01)

(58) Field of Classification Search
CPC ...... G06F 16/334; G06F 16/338; G06F 16/00; G06F 16/148; G06F 16/168; G06F 16/30; G06F 21/6218
See application file for complete search history.

(56) References Cited

U.S. PATENT DOCUMENTS

| | | | |
|---|---|---|---|
| 8,522,129 | B1 | 8/2013 | Verstak et al. |
| 9,805,124 | B2 | 10/2017 | Morris et al. |
| 2006/0047615 | A1* | 3/2006 | Ravin .................... G06N 5/022 706/50 |
| 2010/0166971 | A1 | 7/2010 | Wittenbecher et al. |
| 2011/0093771 | A1 | 4/2011 | Gordon |
| 2011/0208822 | A1 | 8/2011 | Rathod |
| 2012/0166971 | A1* | 6/2012 | Sachson ................ G06Q 50/01 715/753 |
| 2013/0080266 | A1* | 3/2013 | Molyneux ............. G06Q 10/00 705/14.72 |
| 2013/0282504 | A1 | 10/2013 | Lessin |
| 2014/0310623 | A1 | 10/2014 | O'Connell, Jr. et al. |

OTHER PUBLICATIONS

Torre, S., "Versioning in PubMed", NLM Tech Bull, Feb. 15, 2012, 4 pages, Bethesda, Maryland.

"Apache Hadoop", last published Dec. 11, 2014, http://hadoop.apache.org/, 6 pages.

IBM, "InforSphere Streams", printed on Jan. 7, 2015, http://www-03.ibm.com/software/products/en/infosphere-streams/, 2 pages.

* cited by examiner

ESTIMATING ARTICLE PUBLICATION DATES AND AUTHORS BASED ON SOCIAL MEDIA CONTEXT

FIELD

The present application relates generally to computers and computer applications, and more particularly to estimating article publication dates based on computer-implemented social media context.

BACKGROUND

A user researching on a specific subject may ordinarily find many articles and references with conflicting or differing information. Often, it is important to determine the version number or publication date of an article in order to understand the value of the material and for example to know whether it is current or obsolete. Discrepancies in similar reference materials can be caused by outdated documentation or outdated versions that have been replaced or refuted by newer findings, for example, in the areas of scientific discoveries, medical studies, textbooks, or versions of programs and software packages.

It is not always easy or even possible to determine the origination date of a piece of information if it has been posted and re-posted numerous times, for example, by people in social networks, by news commentators or historical information sources. This issue may be especially prevalent in academic papers and many technology blogs.

While cached Internet search results may produce a date, a timestamp of a cached web document does not necessarily correlate to when the document was created. For example, the timestamp might have been updated long after the initial publication, or a user might have posted an old document on a new website which generated an artificially new cache timestamp.

BRIEF SUMMARY

A method and system to estimate initial publication information based on social media context analysis may be provided. The method, in one aspect, may comprise receiving via a user interface, a search string associated with an object. The method may also comprise searching for one or more documents having a title that matches the search string and publication information associated with the one or more documents, the publication information comprising at least one or more authors and publication dates. The method may also comprise searching for the one or more documents that contain the search string within the content of the one or more documents and the publication information associated with the one or more documents using a natural language processing technique, responsive to not finding the one or more documents having the title that matches the search string. The method may also comprise searching social media data for information associated with the search string, information associated with a topic associated with the search string, and information associated with the one or more documents and the publication information. The method may also comprise resolving the one or more documents and the publication information associated with the one or more documents and the information found in the social media data using an artificial intelligence technique. The method may also comprise generating a report comprising the publication information. The method may also comprise presenting the report on the user interface.

In one aspect, the report may comprise an assigned probability associated with each of the one or more authors and publication dates. The publication dates may be listed as ranges of dates in the report. The resolving the one or more documents and the publication information associated with the one or more documents and the information found in the social media data may further comprise generating a timeline using the one or more documents and the publication information associated with the one or more documents and the information found in the social media data.

A system for estimating initial publication information based on social media context analysis, in one aspect, may comprise a user interface operable to run on one or more processors, the user interface operable to receive a search string associated with an object. A historical analytics engine may be operable to run on the one or more processors, the historical engine further operable to search for one or more documents having a title that matches the search string and publication information associated with the one or more documents. The publication information may comprise at least one or more authors and publication dates. The historical analytics engine may be further operable to search for the one or more documents that contain the search string within the content of the one or more documents and the publication information associated with the one or more documents using a natural language processing technique. A stream analytics engine may be operable to run on the one or more processors, the stream analytics engine further operable to search social media data for information associated with the search string, topic associated with the search string, and the one or more documents and the publication information. A media analytics engine may be operable to run on the one or more processors, the media analytics engine further operable to resolve the one or more documents and the publication information associated with the one or more documents and the information found in the social media data using an artificial intelligence technique. The media analytics engine may be further operable to generate a report comprising the publication information and present the report on the user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
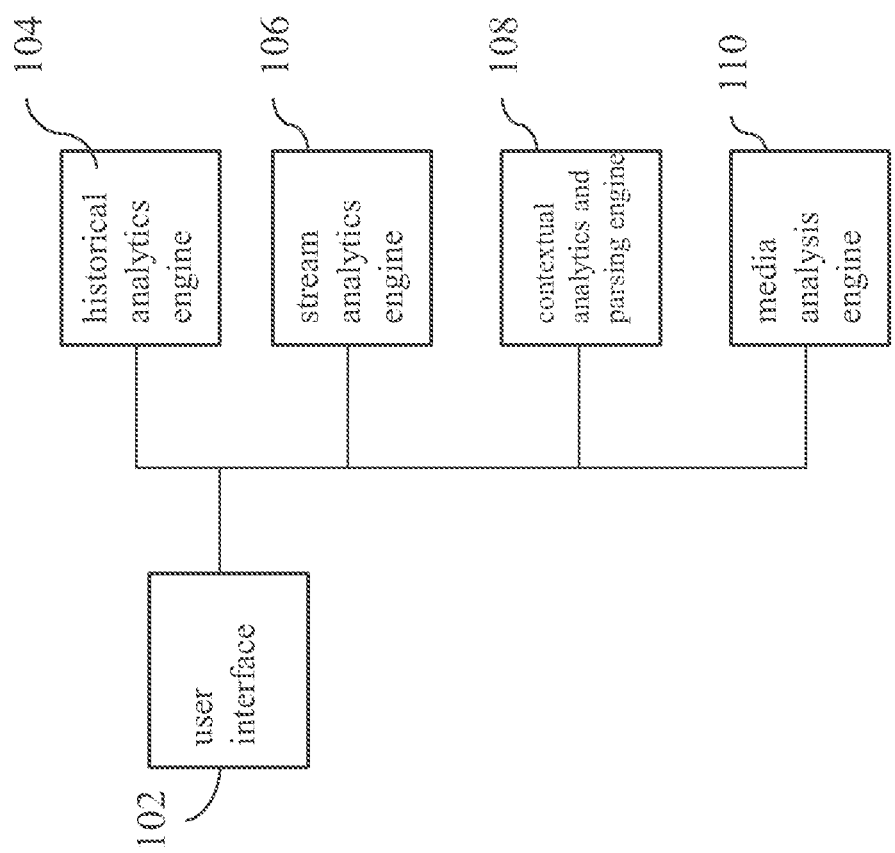
FIG. 1 is a diagram illustrating components of a system in one embodiment that identifies publication dates for objects such as documents.

Techniques are presented for determining publication dates for articles or documents, for example, returned in a search result by a search engine. Techniques of the present disclosure may be implemented as a computer-implemented process or method, and/or a computer system and may improve and/or enhance computer-oriented technology, for example, search engine technology. The techniques of the present disclosure in one embodiment allow a user searching for specific information to request a temporal report as to the probable origination date of any or all references returned by a search engine and the confidence level in the accuracy of the timing information. The report may be optionally displayed along with the search results.

In one embodiment, the derivation of the probable origination date may be accomplished using a stream of data (also referred to as Big Data) captured from the Internet and from other documentation sources such as historical information about the target article (or document), its author, related environmental data, social media data, blogs, microblogs, posts, historical information, and/or other data sources. In one embodiment, the techniques of the present disclosure may include using textual analysis, statistical analytics, and/or artificial intelligence, for example, to combine and correlate all of this information (from data sources) to extract clues that would indicate who the original author (or version) might be and when he/she may have created the article or version. Based on the number of conflicting or validating references, and the relationships between them, a method and/or system of the present disclosure may generate a probability or confidence score in the accuracy of the analysis.

Consider the following example scenario. A search on a topic or subject matter, for example, Aborigine Tribal Practices returns one blog by author M that contains several paragraphs on tribal customs in Australia. A social network post by author N is found that contains one phrase identical to a phrase in author M's blog. One might ask where author M obtained the information because author M is a county clerk of a county in state I and author N is a mystery novelist. Neither looks like a good match to the subject matter. For this example, assume these are the only two references to this material on the Internet. Author M's blog was written Feb. 12, 2007. Author N's post is dated May 6, 2008. Author M's blog was written earlier than Author N's post. To the casual user, it may appear that Author M is the originator of the material and that Feb. 12, 2007 is the date it was written. But since neither is the obvious originator of the material, a method and/or system of the present disclosure in one embodiment may try to find more information about Author M and Author N using social media and other sources.

In one embodiment, a method and/or system of the present disclosure may utilize technology that captures and analyzes data in motion. An example of such technology includes IBM® InfoSphere® Streams (from International Business Machines Corporation, Armonk, N.Y.), an analytic platform or tool that allows user-developed applications to ingest, analyze and correlate information as it arrives from real-time sources. In one embodiment, for data at rest, a method and/or system of the present disclosure may utilize technology providing a programming framework that allows for the distributed processing of large data sets across computers, to analyze historical data. An example of such a framework may include Hadoop® (from the Apache Software Foundation, Forest Hill, Md.).

A technique in the present disclosure utilizes data analytics of historical and social media data to estimate the probable original author and original publication date of the target object of a user search on a topic, article, document, news story, commentary, or other object such that the user can evaluate the probability that the references returned in the search are useful, current, relevant and authentic based on the author and date or not verifiable and/or obsolete.

FIG. 1 is a diagram illustrating components of a system in one embodiment that identifies publication dates and/or authors for objects such as documents. A user interface 102 allows a user to enter a search string associated with an object or document, for example, a document title, a specific document version number, a reference within a communication such as a Web or Internet post, a video stream or any other media containing natural language topics, phrases, sentences, and/or others, and to request feedback as to the original author, latest version, original publication date and/or historically related references. A system that determines a publication date and/or author of an object or document in one embodiment may include a historical analytics engine 104, a stream analytics engine 106, a contextual analytics and parsing engine 108, and a media analysis engine 110 to analyze other media sources. The components (e.g., 102, 104, 106, 108, 110) may be computer-implemented modules that run or execute on one or more hardware processors, which may be located on a single physical machine or distributed across multiple physical machines.

The user interface 102 may allow a user to specify preferences such as which topics or document types should be analyzed and what information should be included in the report. In one aspect, a user may specify these preferences in a profile and/or a user may request analysis and provide preferences at the initiation of the search and/or after a search result has been returned. For instance, the user interface 102 may allow a user to specify a profile that may be stored and retrieved to determine user preferences. In another aspect, the user interface 102 may allow a user to create a profile that may be stored and retrieved. Yet in another aspect, the user interface 102 may provide a form with one or more fields on a graphical user interface window that can be populated or filled in with the user preferences. The information the user populates may be stored as a profile. The user may also be allowed to select or input information sources to search, for example, the Internet, an organization's database, and/or other sources.

In one embodiment, a user entered search string may be received via the user interface 102. The user interface 102, for example, may be a user interface associated with a search engine, and for example, may be one or more of an Internet search engine browser, any other software or hardware program or function with browsing capability for data or Web browsing capability. A search engine may be invoked that performs, e.g., an Internet search (or another data network or source search) based on the user entered search string. A search engine, e.g., returns a list of references or documents determined to be relevant to the search. A historical analytics engine 104, for example, using a contextual analytics and parsing engine 108 may parse the user search string and find or search for references (e.g., all references) that contain the search string or a phrase in the search string in the title of the reference or document. The references may be references or documents found in the World Wide Web (Web) via an Internet search performed by a search engine or documents found from any other data sources, for example, an organization's database or another.

In one aspect, the historical analytics engine 104, stream analytics engine 106, media analysis engine 110 and contextual analytics and parsing engine 108 may be components of a search engine that performs a search based on the user entered search string and returns a list of results. In another aspect, the components 104, 106, 108, 110 may be separate programs that may be invoked, e.g., via application programming interfaces. Yet in another aspect, the functionalities of the components 104, 106, 108, 110 may be implemented in a single program. Any other implementation mechanism may be utilized to implement the functionalities of those components described herein.

If a document with the exact title is found and the author and publication date are found, the processing ends. For example, the user can specify whether the input (in the search string) is a title and should be matched exactly. Otherwise discovering the title of a document with the target search string is a function of the analysis. For example, analysis is performed that may identify the title of the document based on the target search string.

If the search string is designated as an exact title and none is found, the user can continue the search with other forms of input. For example, if no title is found that contains the search string or a phrase in the search string, the historical analytics engine 104, for example, using the contextual analytics and parsing engine 108, may search for references containing the search string in the text of those references. Natural language processing may be used in this search. If the search string, author and publication date are found in the text of one or more of the references, the processing ends.

In one embodiment, a methodology and/or system of the present disclosure may use the least expensive function first and move to progressively more complicated analytics, for example, to optimize computational performance and use of resources in a computer system. The historical analytics engine 104 may check for titles matching the input title, if one is given. Then the historical analytics engine 104 may attempt to find the search string in the body of text documents matching the types selected by the user such as publications, articles, news stories, and or others. This search may include a basic text matching search. Next, the historical analysis engine 104 may broaden the search by using contextual analysis, writing styles, language translation and/or idioms, and other natural language processing techniques. For instance, the historical analysis engine 104 may check first whether the input is a title, and if so, try to match the user title string (search string) with the title of a 'document'. The historical analytics engine 104 returns a result to the user and if null, the user can elect to continue the search. The historical analysis engine 104 may be invoked again (possibly with additional input), for example, responsive to the user electing to continue the search, and the historical analysis engine 104 searches for the string (which may be the original title or a modified string) in the body of a document. The historical analysis engine 104 also can exploit contextual search, writing style matching, idioms, and language translation to find documents with wording that has the same or similar meaning or connotation as the input. If this fails, stream analysis may be invoked as described below.

If the search string is not found in the document title (title of a reference) and the search string is not found in the text of the document (reference) with author and publication date, a stream analytics engine 106 may be invoked. For example, if the historical analytics engine 104 does not provide the publication information, a stream analytics engine 106 may be invoked. The stream analytics engine 106 looks for or searches to find the search string in the body of a broader range of sources like social media posts, voice documents, video documents, recorded media, possibly phone conversations and/or text messages. This search may include a contextual search using idioms, voice translation, language translation, and/or other, for example, using the contextual analytics and parsing engine 108.

If the stream analytics engine 106 does not provide the publication information, further analytics may be performed by a media analysis engine 110. Thus, a methodology and/or system in one embodiment of the present disclosure may include a multiple hierarchy of searches that looks for additional information such as author's profession, education, experience and other information.

A media analysis (or analytics) engine 110 searches to find additional reference material to verify and/or correlate conflicting or incomplete conclusions from the historical and stream analytics functions. For example, the media analytics engine 110 may search for indirectly related persons and information sources. The media analytics engine 110 may use artificial intelligence to establish probable relationships between all of the above collected search results and formulate a probability of the accuracy of the most likely outcome. Functions of the media analytics engine 110 broaden the search to find background data relative to authors and dates that may resolve inconsistencies, for example, when there are multiple possible authors and dates.

Figure 2:
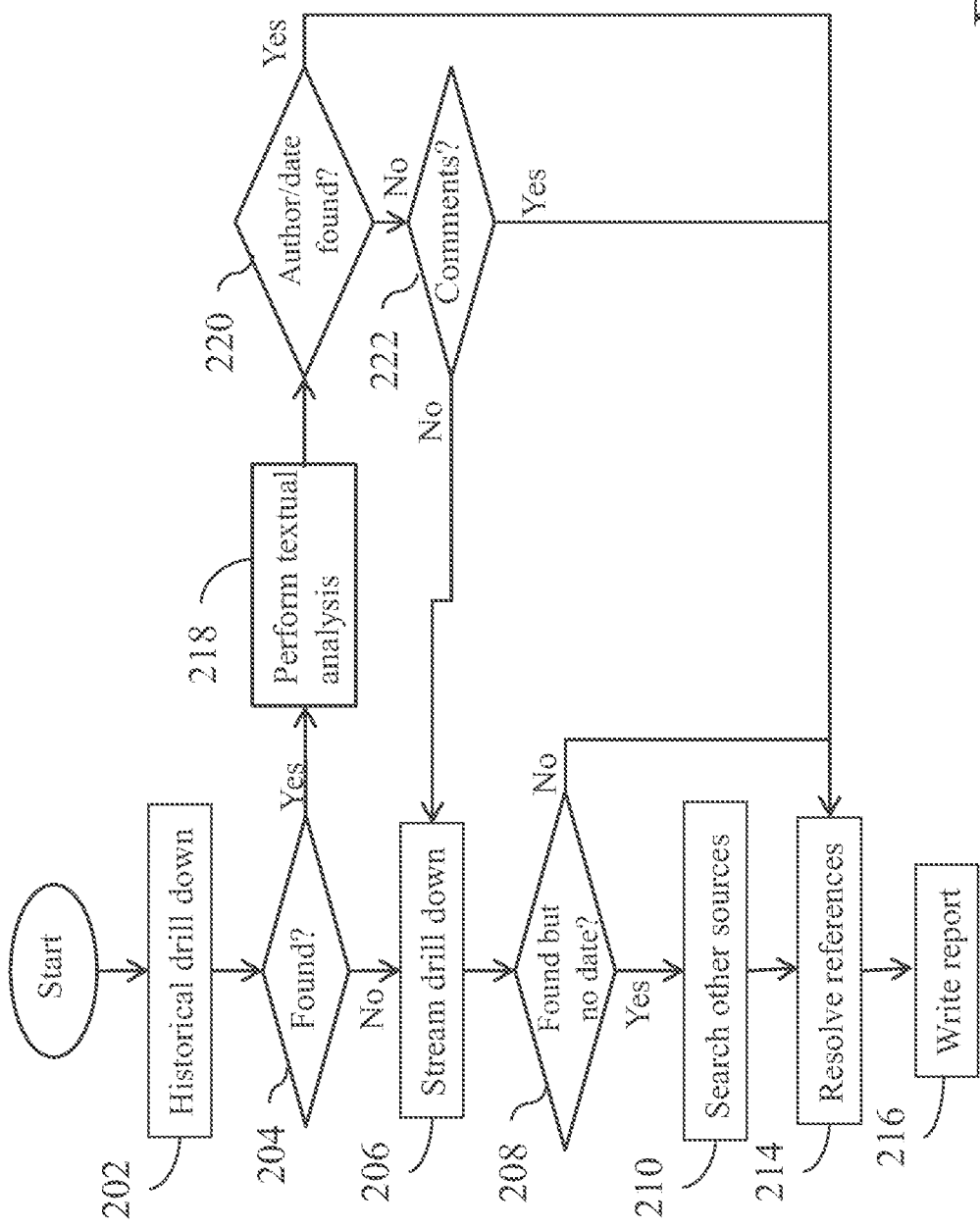
FIG. 2 is a flow diagram illustrating an overview of an analytics method for determining or estimating article or object publication dates in one embodiment of the present disclosure.
Figure 3:
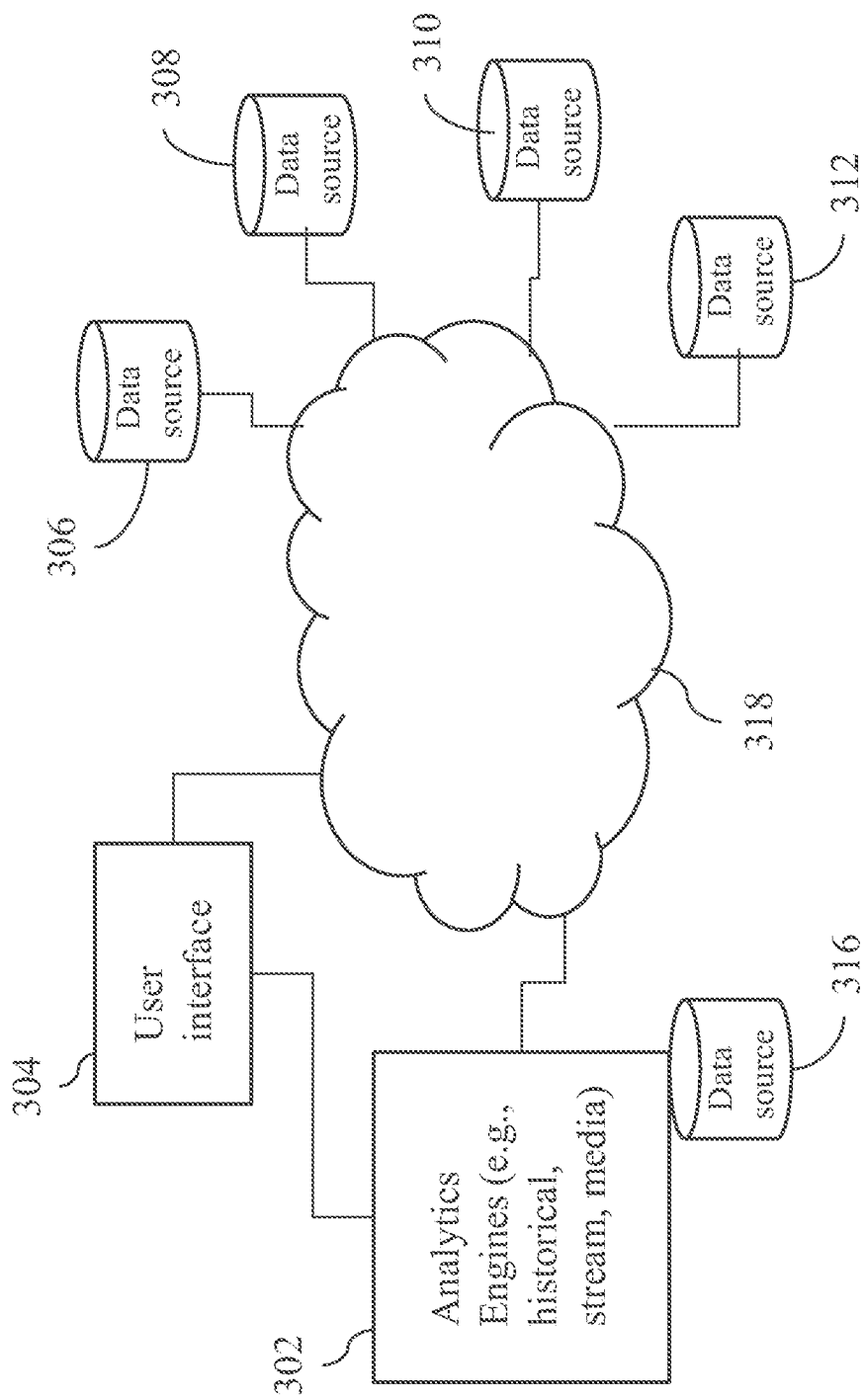
FIG. 3 is another diagram illustrating components that may estimate initial publication information of an object (e.g., article or document) based on social media context in one embodiment of the present disclosure.

The above described analytics that comprise a hierarchical drill down methodology in one embodiment is shown with reference to FIG. 2. Resulting references from performing the drill down analytics may be resolved. The search of the references may end and the results (obtained publication information) may be presented or displayed to the user, for example, via the user interface 102, for example, according to the user preference.

FIG. 2 is a flow diagram illustrating an overview of a drill down analytics method for determining or estimating article or object publication dates in one embodiment of the present disclosure. At 202, a historical drill down may include performing a historical analysis by retrieving text of all publications, news stories, articles, and other such objects on the topic or subject matter specified by the user in the search string. Author and dates where available may be also retrieved. At 204, if no documents are found from performing the historical analysis, the logic of the method proceeds to 206 to stream drill down. If documents are found at 204, at 218, textual analysis of subject matter, writing style, wording, spelling, idioms and other natural language processing may be performed to find the author and date (and optionally other information) about the publication (specified in the user entered search string) in the text of the documents. At 220, if the author and date information about the publication is found in the textual analysis, the logic of the method proceeds to 214. At 220, if the author and date information is not found from the analysis, at 222, it is determined whether there is any confirming or opposing comments from other authors discovered in the textual analysis. If there are no confirming or opposing comments about the publication from other authors, the logic of the method proceeds to 206 to stream drill down. If at 222 it is determined that the textual analysis uncovered a confirming or opposing comment about the publication from one or more other authors, the logic of the method proceeds to 214 to resolve the information so far discovered including the confirming or opposing comment.

The historical analysis, for example, may take as input one or more of the following parameters: a document title (e.g., article, technical paper, software program name) or search string text (e.g., to be found embedded in a document). Optionally, the historical analysis may also take as input a version number, document type(s) to search. The historical analysis may output an author and publication date, and if there is an indication of a version of the document, the most recent version number, for example. If the above output cannot be determined during the first pass, control to user may be returned to a user. The user may decide to continue or discontinue the search. For example, the historical analysis may include receiving input from the user as to whether to continue the search. If no, then the logic of the process ends. If yes, that is, the user selected to continue the search, the historical analysis may further use contextual analysis, writing styles, language translation, idioms, and/or other analysis to find author and publication date or latest version number. In one embodiment, the additional analysis to continue the search may be performed automatically without returning control to the user and receiving user input. In one embodiment, a user may specify in a profile the option to automatically continue or discontinue the search without returning control to the user. The historical analysis outputs author and publication date, and may also output the latest version number, if found. If not found, stream analytics engine may be called.

At 206, stream drill down may be performed. The processing at 206 may include a stream analysis, for example, which may include searching data streams for text similar to or matching the search string (and/or associated topic) and retrieving text of all blogs, posts, microblogs, social network and social media references to this topic, retrieving authors and dates where available using contextual searches, and translating voice or other media to text. These references retrieved by stream analysis are referred to as secondary references. The stream analysis may also include searching social media sites for references to the uniform resource locator (URL) of the document being searched. This may include recursively expanding shortened URLs that are common on some sites. By using the earliest reference to a particular document on social media, the date of publication may be narrowed down and may help refine a result in combination with other analysis performed. At 208, if one or more references associated with the topic or publication in the stream analysis is found but the date associated with the one or more references is not available, the logic of the method proceeds to 210 to search other sources. If no references are found that are associated with the user entered search string (publication or topic) by the stream analysis, the logic of the method proceeds to 214. In case where references are found by the stream analysis including publication date and/or author information, the logic of the method may also proceed to 214.

Stream analysis may take as input all user inputs from the historical engine or historical analysis (e.g., titles, strings, document types, version numbers) and all outputs from the historical analysis (e.g., references, probable dates, probable versions, probable authors). Stream analysis may output additional information or data such as references, probable dates, probable versions, and/or probable authors.

At 210, media analysis is performed. Media analysis at 210 may include searching other sources, for example, other documents related to one or more authors found in stream analysis at 206, social network comments, for example, by friends of the one or more authors found in stream analysis at 206, travel information, school yearbooks, classmates, acquaintances or authors, and posts by relatives and friends of authors. The references discovered by the media analysis at 210 are referred to as tertiary references. If relatives or classmates of one or more authors are found in the media analysis, documents pertaining to the relatives or classmates and the dates associated with those documents are searched. If no additional references are found in the media analysis, the logic of the method proceeds to 214.

Media Analysis may take as input all previous inputs and outputs from historical analysis and stream analysis. The media analysis or a media analytics engine searches to find additional reference material to verify and/or correlate conflicting or incomplete conclusions from the historical and stream analytics functions. The media analysis, for example, may include searching for indirectly related persons and information sources. The media analysis may use artificial intelligence to establish probable relationships between all of the above collected search results and formulate a probability of the accuracy of the most likely outcome. The media analytics engine or the media analysis, in one aspect, broadens the search to find background data relative to authors and dates that may resolve inconsistencies when there appears to be multiple possible authors and dates. The media analytics engine or the media analysis outputs a report (e.g., a final report), which may include a list of references found from previous steps. For each reference, the media analytics engine or the media analysis outputs possible authors and dates each with a probability of accuracy.

At 214, the media analysis may also include resolving the references discovered in the above-described analysis processes (e.g., historical analysis, stream analysis, and/or media analysis). Resolving references at 214 in one embodiment includes creating a time line with authors, acquaintances, secondary references and dates, tertiary references and dates. A probability value may be assigned that indicates whether each date is related to the original search. The original search, for example, is the title or text string input by the user. During the searching operations, it may be true that the user input a title that was inaccurate, but based on the matches found by the various engines (or analysis processes) there may be a high probability that a somewhat different title is really the one the user intended. In one embodiment, the probabilities may be computed based on conclusions of the media analysis or engine, for example, using artificial intelligence, as to whether the relationships between the document, its content, the authors and the dates are consistent with each other and consistent with what the user seems to be searching for. Dates in the timeline with highest probability of having a relationship to the search may be selected. Most probable date range may be selected for determining the publication date of an article or object. An overall confidence level may be assigned to the selected dates.

At 216, a report may be generated including publication information, for example, the determined date and/or authors. The content and format of the report may be tailored based on the user preference, for example, specified by a user in a profile and/or via the user interface. The report may be presented on a user interface.

The following illustrates an example of a time line analysis. Consider as an example that the search string includes "Aborigine Tribal Practices—exocannibals consume rivals". The following information is discovered via the historical analytics, stream analytics and/or media analytics:

1. Author M blog Feb. 12, 2007 several paragraphs on Aborigine tribal customs, used words exocannibal and rival.

2. Search on Author M shows low probability of being the original author—she is a county clerk.
3. Search on Author M shows student at University of M from 2004-2008.
4. Author N's social network post on May 6, 2011 contained word "exocannibal".
5. Search on Author N shows low probability of being the original author—he is a novelist.
6. Search on Author N in a social network site shows that he was previously an archaeology professor from 2004 to 2008 and the social network site has numerous photos and posts about his first novel, "Honor Among Head Hunters".
7. Search of "Honor Among Head Hunters" on a web site has a photo of author next to a tribal native in a tribal village with tents in background.
8. Facial recognition technique shows the author is Author N.
9. A crowd sourced information website with no publication date used word "exocannibals" but bibliography refers to 2013 encyclopedia as a source.
10. An online encyclopedia article shows date that is not early enough.

The following probabilities are assigned based on the above findings:
1. Author M as author has low probability, e.g., 10%.
2. Author N as author has high probability, e.g., 90%.
3. Date later than 2003 has high probability, e.g., 100%.
4. Date earlier than 2013 has high probability, e.g., 99%.
5. Date earlier than Feb. 12, 2007 has high probability, e.g., 90%.
6. Most probable date 2006.

Based on the above timeline with assigned probability on different dates of publication, a user report is generated. The user report may identify that the probable author of original material used in Author M's blog is Author N, with probable origination date between 2004 and 2007, e.g., the probability that the authors and publication dates are correct.

Figure 4:
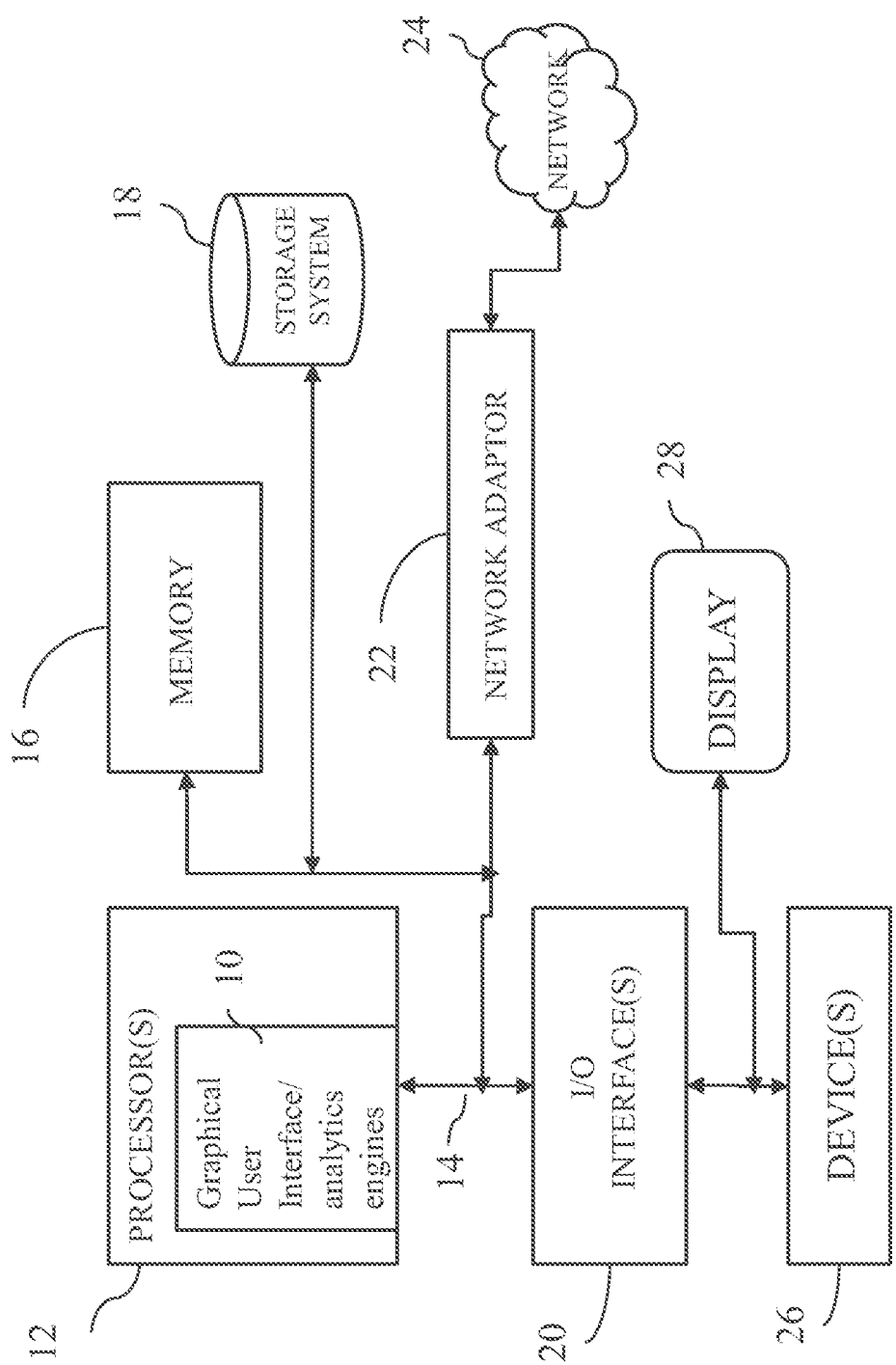
FIG. 4 illustrates a schematic of an example computer or processing system that may implement the publication date estimation system in one embodiment of the present disclosure.

FIG. 4 is another diagram illustrating components that may estimate initial publication information of an object (e.g., article or document) based on social media context in one embodiment of the present disclosure. As described with reference to FIGS. 1 and 2, analytics engines 302 (e.g., historical, stream, and media analytics engines) may search one or more data sources 306, 308, 310, 312, 316 to discover and resolve publication information (e.g., author and publication date) associated with an object such as an article or document. Also as described above, the data sources 306, 308, 310, 312, 316 may include data from the Internet, social media data, organization's database and/or other sources. One or more of the analytics engines 302 may connect to, search for, and retrieve information, from one or more of the data sources 306, 308, 310, 312 via a network 318. One or more of the analytics engines 302 may connect to, search for, and retrieve information, from one or more of the data sources (e.g., 316) locally. For example, a data source may be connected locally to one or more processors running the one or more analytics engines 302. A user interface 304 may run on one or more processors that may be locally connected to the one or more processors running the one or more analytics engines 302, or remotely connected to the one or more processors running the one or more analytics engines 302 via a network 318.

A technique of the present disclosure, for example, as described above, estimates a document's initial publication information, for example, based on social media context analysis. The technique may include applying natural language processing (NLP) to a document to identify attributes of the document, and searching social media and other repositories of information, for example, the Internet and/or other data sources, recursively for information comprising references, dates, and authors matching at least one attribute of the document to determine correlations between portions of information and to determine initial publication information. The initial publication information of the document is presented or displayed on a user interface, for example, to a user. In one aspect, the initial publication information may comprise information such as date, data range, author, title, and location. A calculated probability of correctness may be displayed. In one aspect, the repositories of information may include environmental data, social media data, blogs, microblogs, posts, historical information. Analytics such as textual analysis, statistical analytics, and artificial intelligence (AI) may be performed to determine the initial publication information.

FIG. 4 illustrates a schematic of an example computer or processing system that may implement the publication date estimation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of estimating initial publication information based on social media context analysis, comprising:
 receiving a search string associated with an object;
 searching cached Internet content for one or more documents having a title that matches the search string and publication information associated with the one or more documents, the publication information comprising at least one or more authors and publication dates, wherein the one or more documents comprise cached Internet search result and the publication information is associated with the cached Internet search result;
 searching for the one or more documents that contain the search string within the content of the one or more documents and the publication information associated with the one or more documents, responsive to not finding the one or more documents having the title that matches the search string;
 searching social media data posted on a social networking website, for information associated with the search string, topic associated with the search string, and the one or more documents and the publication information; and
 resolving the one or more documents and the publication information associated with the one or more documents and the information found in the social media data, the resolving comprising at least determining the authors and the publication dates of the one or more documents,
 wherein the resolving the one or more documents and the publication information associated with the one or more documents and the information found in the social media data further comprises generating a timeline using the one or more documents and the publication information associated with the one or more documents and the information found in the social media data, the timeline comprising at least historical information associated with the authors,
 the resolving correcting accuracy of the cached Internet search result returned by a search engine.

2. The method of claim 1, further comprising generating a report comprising the publication information, wherein the report comprises an assigned probability associated with each of the one or more authors and publication dates.

3. The method of claim 2, wherein the publication dates are listed as ranges of dates in the report.

4. The method of claim 1, wherein the social media data comprises one or more of blogs, microblogs, social network posts, social media posts.

5. The method of claim 1, wherein the searching the social media data further comprises searching for one or more uniform resource locator associated with the one or more documents and the object.

6. The method of claim 1, wherein the publication information further comprises one or more of the title and location.

7. The method of claim 1, wherein the searching for the one or more documents that contain the search string within the content of the one or more documents and the publication information associated with the one or more documents comprises searching one or more of Internet data, historical data, and environmental data.

* * * * *